(12) United States Patent
Giometti

(10) Patent No.: US 6,808,060 B1
(45) Date of Patent: Oct. 26, 2004

(54) CONTAINER INSPECTION MACHINE

(75) Inventor: Stephen M. Giometti, Horseheads, NY (US)

(73) Assignee: Emhart Glass S.A., Cham (CH)

( * ) Notice: Subject to any disclaimer, the term of this patent is extended or adjusted under 35 U.S.C. 154(b) by 0 days.

(21) Appl. No.: 10/610,420

(22) Filed: Jun. 30, 2003

(51) Int. Cl.[7] .................................................. B65G 47/24
(52) U.S. Cl. ...................... 198/416; 198/399; 198/481.1
(58) Field of Search ................................ 198/399, 412, 198/416, 474.1, 475.1, 480.1, 481.1

(56) References Cited

U.S. PATENT DOCUMENTS

| | | | | |
|---|---|---|---|---|
| 3,717,236 A | * | 2/1973 | New .......................... | 198/480.1 |
| 3,958,688 A | * | 5/1976 | Sterling ....................... | 198/416 |
| 4,465,175 A | * | 8/1984 | Caldwell ...................... | 198/399 |
| 4,779,714 A | * | 10/1988 | Madden ........................ | 198/399 |
| 4,832,173 A | * | 5/1989 | Hattori et al. ............... | 198/416 |
| 6,109,420 A | * | 8/2000 | Poppi et al. ................. | 198/416 |

* cited by examiner

Primary Examiner—James R. Bidwell
(74) Attorney, Agent, or Firm—Spencer T. Smith

(57) ABSTRACT

A machine for inspecting a transparent container. The machine utilizes a starwheel to convey non-round bottles through a number of inspection stations before releasing the bottles to an outfeed belt conveyor. The starwheel conveyor has a plurality of pockets and as a bottle is about to be released it engages a brush guide rail for properly orienting a misoriented bottle. The brush has a front edge which is concentric to the axis of the star wheel so that it will interfere with a misoriented bottle. The brush is mounted via upper and lower plates which have a front edge radially spaced from the front edge of the brush at the location where a misoriented non-round bottle will first engage the brush. The radial spacing decreases to zero as the bottle is displaced along the brush. The front edge of the brush is located so that the bottle will have an acceptable orientation at the location where the radial spacing is zero.

3 Claims, 2 Drawing Sheets

CONTAINER INSPECTION MACHINE

The present invention relates to machines which inspect bottles for defects and more particularly to such machines wherein a bottle is conveyed through one or more inspection stations via a star wheel conveyor.

BACKGROUND OF THE INVENTION

In state of the art glass bottle inspection machines bottles are transferred to a star wheel conveyor which transports the bottles through a number of inspection stations.

In such machines the bottles are conventionally rotated at one or more of the inspection stations and as a result, should the bottles be non-round (a flask for example), the bottles would be released from the star wheel at a random orientation and this is undesirable.

OBJECT OF THE INVENTION

It is accordingly an object of the present invention to provide an orienting mechanism which will reorient a non-round bottle conveyed by a star wheel conveyor to a selected orientation prior to discharge.

Other objects and advantages of the present invention will become apparent from the following portion of this specification and from the accompanying drawings which illustrate, in accordance with the mandate of the patent statutes, a presently preferred embodiment incorporating the principles of the invention.

BRIEF DESCRIPTION OF THE PREFERRED EMBODIMENT

Figure 1:
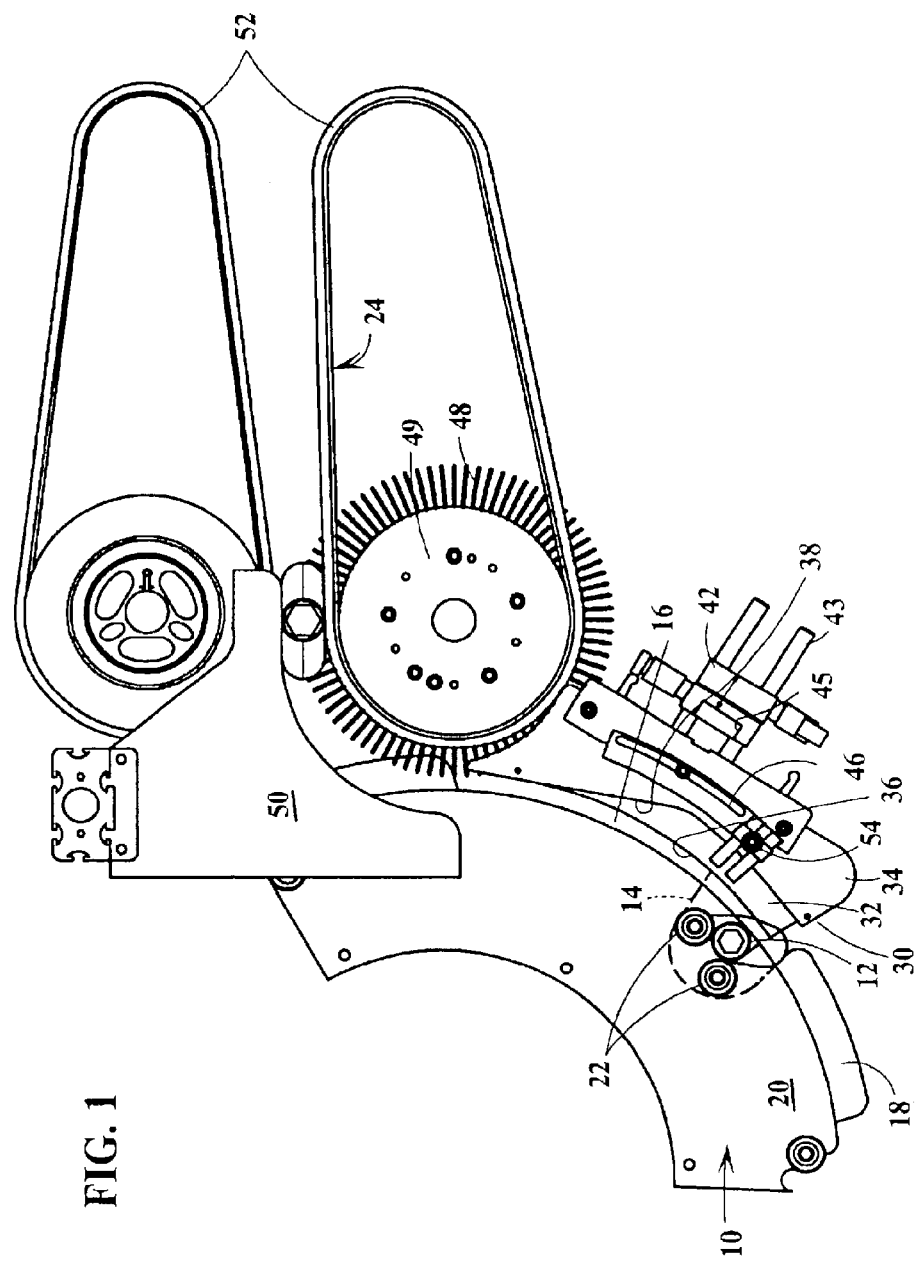
FIG. 1 illustrates a segment of an indexing star wheel feeder releasing a bottle to a belt drive outfeed conveyor.

FIG. 1 illustrates a segment of an indexing star wheel feeder 10 of a container inspection machine. Non-round containers 12, here a flask, enter the star wheel by use of a timing feed screw (not shown) which releases containers, one at a time, at a timed frequency that releases the containers into open pockets 14 in the star wheel. The containers are supported on a star wheel base plate 16, the pockets are defined in an intermediate plate or plates 18 and a top plate 20 supports roller pairs 22 which engage the finish of the container and can be driven to rotate the container as desired.

The starwheel indexes rotationally a fixed amount and stops or dwells for a predetermined period of time so that an inspection can take place. The starwheel continues the index and dwell cycle processing the container through the inspection stations. After the last inspection station, the container is removed from the starwheel and delivered to an opposed belt conveyor 24.

Figure 2:
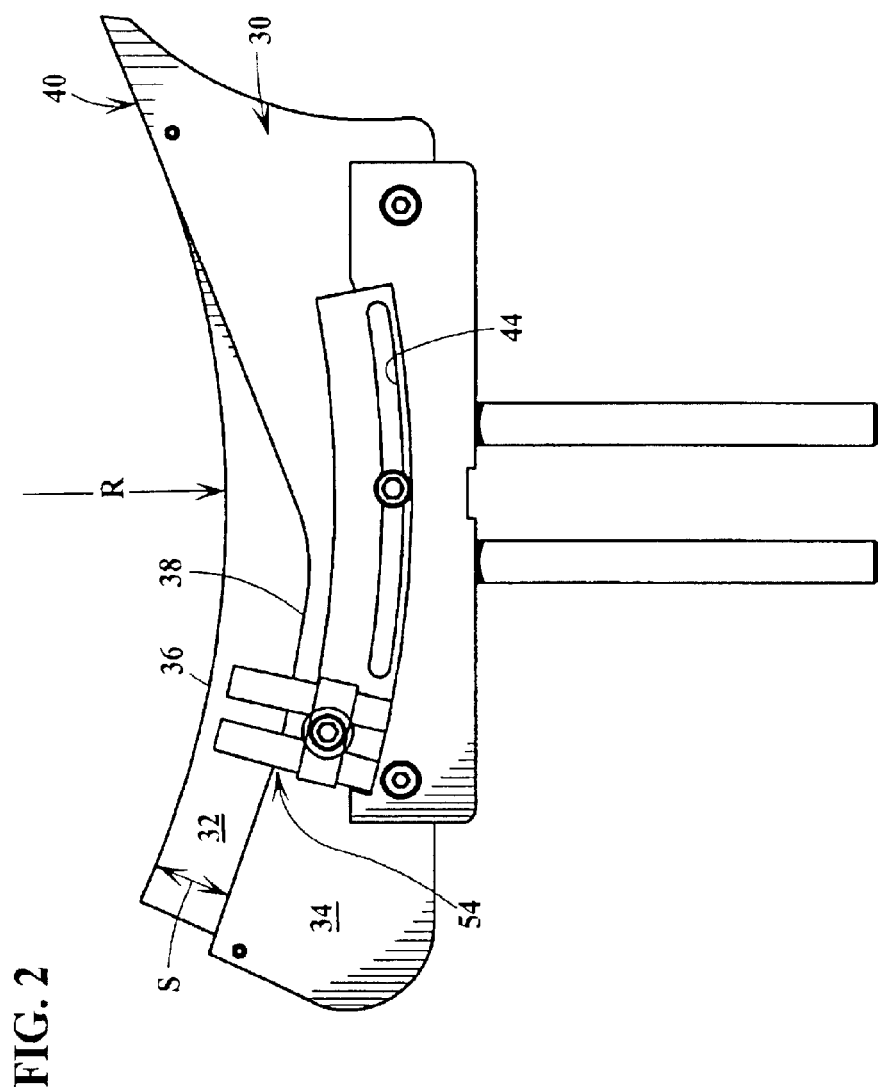
FIG. 2 is an enlarged elevational view of the brush guide rail shown in FIG. 1.

FIG. 2 illustrates a brush guide rail 30 for rotating a randomly oriented container to a selected orientation. The brush rail guide has a nylon bristle brush 32 which is clamped between upper 34 and lower plates (the lower plate is not shown). The brush 32, when mounted (FIG. 1), has a curved front edge 36 which is substantially concentric to the axis of the starwheel (radius R) and is located so that the non-round bottle will be reoriented to an orientation within an angular range acceptable for transfer to the belt drive conveyor.

The upper and lower plates have a curved front edge 38, which at the end remote from the belt conveyor is substantially spaced from the front edge of the brush (separation S) and which as the brush approaches the belt conveyor gradually decreases until this edge merges with the continuing concentric edge 40 of the upper and lower plates.

The brush guide rail is mounted on a suitable machine support 42 which can be displaced along a pair or rods 43 for radial displacement to radially locate the edge of the brush an along a vertical slot 45 for vertical adjustment. The brush guide rail also includes an adjustment slot 46 for adjusting the front edge of the brush as desired.

As the container indexes by the brush 32, the brush will apply a progressively increasing resistive force to the outer edge of the container. Due to this force and the motion of the container, a rotational force will be applied to the container and the container will rotate to its desired orientation before it engages the front edge 40 of the plates.

An annular brush 48 on the adjacent belt drive pulley 49 will drag the released bottle along a fixed rail 50 into the opposed drive belts 52 of the belt drive conveyor 24. In addition a tipping device 54 can be added, if desired to assist in getting the container to rotate. The tipping device may be of elastomeric material and is adjustable axially.

What is claimed is:

1. A machine for inspecting a transparent container comprising bottle outfeed means including a belt conveyor having opposed drive belts and a fixed rail for receiving a bottle released from a starwheel conveyor, a starwheel conveyor rotatable about an axis and including a plurality of pockets for holding randomly oriented non-round bottles, said starwheel conveyor releasing oriented non-round bottles to said bottle outfeed means, brush guide rail means for orienting a bottle randomly oriented within a star wheel pocket including a brush having a front edge, mounting means for mounting said brush with the front edge of the brush at a location which would interfere with a misoriented bottle, the front edge of the brush being substantially concentric to the axis of the star wheel, and said mounting means including plate means for clamping the brush, said plate means having a front edge being radially spaced from the front edge of the brush at the location where a misoriented non-round bottle will first engage the brush with the radial spacing decreasing to zero as the bottle is displaced along the brush, the front edge of the brush being selectively located so that the bottle will have an acceptable orientation at the location where the radial spacing is zero.

2. A machine for inspecting a transparent container according to claim 1 wherein the front edge of said plate means extends beyond the end of said brush continuing the concentric front edge of the brush.

3. A machine for inspecting a non-round container which is being conveyed along a circular path at a random orientation within a pocket of a star wheel conveyor comprising guide rail means for engaging a randomly oriented container being conveyed by the star wheel conveyor and orienting the container at a desired orientation including a linear brush defining an edge concentric with the circular path of the container, the first corner of the edge being in the path of a randomly oriented container and upper and lower plates for clamping the linear brush and defining an edge extending along the linear brush, the plate edge spaced from the brush edge proximate the first corner, the space between the plate edge and the brush edge decreasing to zero at a defined location along the brush and the plate edge, from the defined location on substantially continuing the edge of the linear brush.

\* \* \* \* \*